(12) United States Patent
Muranaka (10) Patent No.: US 11,701,711 B2
(45) Date of Patent: Jul. 18, 2023

(54) METHOD FOR MANUFACTURING MATERIAL POWDER FOR METAL LAMINATING MODELLING

(71) Applicant: SODICK CO., LTD., Kanagawa (JP)

(72) Inventor: Katsutaka Muranaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 51 days.

(21) Appl. No.: 16/929,130

(22) Filed: Jul. 15, 2020

(65) Prior Publication Data

US 2021/0031270 A1    Feb. 4, 2021

(30) Foreign Application Priority Data

Jul. 31, 2019 (JP) .................. 2019-141030

(51) Int. Cl.
  *B22F 9/04* (2006.01)
  *B22F 10/73* (2021.01)
    (Continued)

(52) U.S. Cl.
  CPC ............. *B22F 10/73* (2021.01); *B22F 1/052* (2022.01); *B22F 9/04* (2013.01); *B22F 10/00* (2021.01);
    (Continued)

(58) Field of Classification Search
  CPC ................ B23K 15/086; B28B 1/001; B22F 2003/1057; B22F 9/04; B22F 10/00; B22F 10/73; B22F 10/34; B22F 1/052;
    B22F 10/10; B22F 2009/001; B22F 2009/046; B22F 2202/11; B22F 2302/256; B22F 2302/45; B22F 2303/01; B22F 2304/10;
    (Continued)

(56) References Cited

U.S. PATENT DOCUMENTS 10,569,331 B2   2/2020   Kawada et al.
2016/0002471 A1   1/2016   Peng et al.
    (Continued)

FOREIGN PATENT DOCUMENTS

CN    107428081    12/2017
CN    108941553    12/2018
    (Continued)

OTHER PUBLICATIONS

Carson et al ("Bulk Properties of Powders", ASM Handbook, vol. 7: Powder Metal Technologies and Applications, 1998) (Year: 1998).*
    (Continued)

*Primary Examiner* — Robert S Jones, Jr.
*Assistant Examiner* — Jiangtian Xu
(74) *Attorney, Agent, or Firm* — JCIPRNET (57) ABSTRACT

Provided is a method for manufacturing material powder for metal laminating modelling, in which a virgin material is manufactured based on the particle size distribution of the virgin material being an unused material powder, and the fluidity of an unsintered reused material after the virgin material is reused a predetermined number of times by a metal laminating modelling device, so that the particle size distribution of the virgin material corresponds to the fluidity (Continued)

of the reused material that is equal to or greater than a predetermined standard value. Silica particles may be added to the virgin material.

7 Claims, 6 Drawing Sheets

(51) Int. Cl.
| | |
|---|---|
| *B22F 10/00* | (2021.01) |
| *B22F 10/34* | (2021.01) |
| *B33Y 70/00* | (2020.01) |
| *B33Y 10/00* | (2015.01) |
| *B33Y 70/10* | (2020.01) |
| *B22F 1/052* | (2022.01) |
| *B22F 9/00* | (2006.01) |
| *B22F 10/28* | (2021.01) |
| *B22F 12/41* | (2021.01) |
| *B22F 12/49* | (2021.01) |

(52) U.S. Cl.
CPC .............. *B22F 10/34* (2021.01); *B33Y 10/00* (2014.12); *B33Y 70/00* (2014.12); *B33Y 70/10* (2020.01); *B22F 10/28* (2021.01); *B22F 12/41* (2021.01); *B22F 12/49* (2021.01); *B22F 2009/001* (2013.01); *B22F 2009/046* (2013.01); *B22F 2202/11* (2013.01); *B22F 2302/256* (2013.01); *B22F 2302/45* (2013.01); *B22F 2303/01* (2013.01); *B22F 2304/10* (2013.01); *B22F 2999/00* (2013.01)

(58) Field of Classification Search
CPC ..... B22F 2999/00; B33Y 10/00; B33Y 70/00; B33Y 70/10
See application file for complete search history.

(56) References Cited

U.S. PATENT DOCUMENTS

| | | | |
|---|---|---|---|
| 2018/0339466 A1 | 11/2018 | El Naga et al. | |
| 2019/0143413 A1 | 5/2019 | Dave et al. | |
| 2020/0362142 A1* | 11/2020 | Saito | ........................ C08K 5/17 |

FOREIGN PATENT DOCUMENTS

| | | | | |
|---|---|---|---|---|
| EP | 3415563 | | 12/2018 | |
| JP | 2005335199 | | 12/2005 | |
| JP | 2005335199 | A * | 12/2005 | .............. B22F 3/105 |
| JP | 2016041850 | | 3/2016 | |
| JP | 6461463 | | 1/2019 | |

OTHER PUBLICATIONS

Amano ("External additive of toner", Journal of the Imaging Society of Japan, vol. 43, 2004) (Year: 2004).*
"Office Action of Japan Counterpart Application", dated Apr. 13, 2020, with English translation thereof, p. 1-p. 10.

* cited by examiner

FIG. 6

METHOD FOR MANUFACTURING MATERIAL POWDER FOR METAL LAMINATING MODELLING

CROSS-REFERENCE TO RELATED APPLICATION

This application claims the priority benefit of Japanese Application Serial No. 2019-141030, filed on Jul. 31, 2019. The entirety of each of the above-mentioned patent applications is hereby incorporated by reference herein and made a part of this specification.

BACKGROUND

Technical Field

The disclosure relates to a method for manufacturing material powder for metal laminating modelling.

Related Art

The metal laminating modelling device of Patent literature 1 (U.S. Pat. No. 10,569,331 (B2)) alternately repeats a recoating step of forming a material powder layer and a sintering step of forming a sintered layer. In the recoating step, the material powder for metal laminating modelling is evenly spread to a predetermined height on a table to form a material powder layer. In the sintering step, a predetermined irradiation region of the material powder layer is irradiated with a laser light or an electron beam to heat and melt the material powder, and then the molten material powder is cooled and solidified, thereby sintering the material powder layer in the predetermined irradiation region and forming a sintered layer. A three-dimensionally modelled object is a three-dimensional sintered body formed by the laminating modelling of sintered layers on a table. The metal laminating modelling device includes a cutting device as necessary to implement a cutting step of cutting the sintered body every time a predetermined number of sintered layers are laminated.

The metal laminating modelling device has a recoater head that moves above the table. The recoater head accommodates the material powder that is periodically supplied from a material supply device, and discharges the material powder onto the table while moving. The recoater head includes a blade to level the material powder on the table while moving. The material powder layer is formed by moving the recoater head above the table after the table is lowered by a predetermined distance. The term "on the table" means the upper surface of the table, the upper surface of a base plate attached to the upper surface of the table, the upper surface of the previously formed sintered layer, or the upper surface of the previously formed material powder layer.

When the modelling is completed, the metal laminating modelling device greatly lowers the table and discharges the unsintered material powder into a bucket from a lower discharge port. The material powder in the bucket is returned to the material supply device by using a transfer device and is reused.

The fluidity of the material powder for metal laminating modelling may be reduced with repeated reuse. The material powder with reduced fluidity prevents the formation of a material powder layer having a uniform thickness and density as well as the formation of a sintered layer having a desired shape, and finally leads to deterioration in the quality of the three-dimensionally modelled object. The material powder with reduced fluidity also causes cavities in the three-dimensionally modelled object.

From the results of the study, the applicant of the present application has found that the particle size distribution of a virgin material being unused material powder is associated with the fluidity of a reused material being reused material powder. The applicant of the present application has found that the reduction in the fluidity of the reused material can be suppressed if the virgin material is manufactured at a predetermined particle size distribution. In addition, from the results of the study, the applicant of the present application has found that the reduction in the fluidity of the reused material can be suppressed if a predetermined amount of silica particles is added to the material powder.

In addition, from the results of the study, the applicant of the present application has found that the fluidity of the reused material is reduced because the state of the surfaces of the powder particles of the reused material changes from the state of the surfaces of the powder particles of the virgin material. In particular, from the results of the study, the applicant of the present application has found that the fluidity of the reused material powder is reduced because even when only the following process is repeated in which the material powder is supplied to the metal laminating modelling device and then discharged without performing laminating modelling, and subsequently the discharged reused material is recovered and supplied to the metal laminating modelling device again, the state of the surfaces of the powder particles of the material powder that has been reused repeatedly changes from the state of the surfaces of the powder particles of the unused material powder.

Therefore, an embodiment of the disclosure propose a method for manufacturing material powder for metal laminating modelling which is capable of suppressing reduction in fluidity even when reused.

SUMMARY

An embodiment of the disclosure provides a method for manufacturing material powder for metal laminating modelling which is a method in which material powder for metal laminating modelling is manufactured based on the particle size distribution of a virgin material being the material powder that is unused, and the fluidity of a reused material being the material powder that is unsintered, so that the particle size distribution corresponds to the fluidity that is greater than or equal to a predetermined standard value of the fluidity, wherein the fluidity of the reused material is obtained after implementing a durability test in which the virgin material is reused a predetermined number of times in a manner that the virgin material is supplied to a metal laminating modelling device and then the reused material discharged from the metal laminating modelling device is recovered, subsequently, the reused material is supplied to the metal laminating modelling device and the reused material discharged from the metal laminating modelling device is recovered.

DESCRIPTION OF THE EMBODIMENTS

An embodiment of the disclosure provides a method for manufacturing material powder for metal laminating modelling of the disclosure is capable of manufacturing material powder for metal laminating modelling for which reduction in fluidity is suppressed even when reused and the laminating modelling of a high quality metal laminating modelled object can be implemented.

Figure 1:
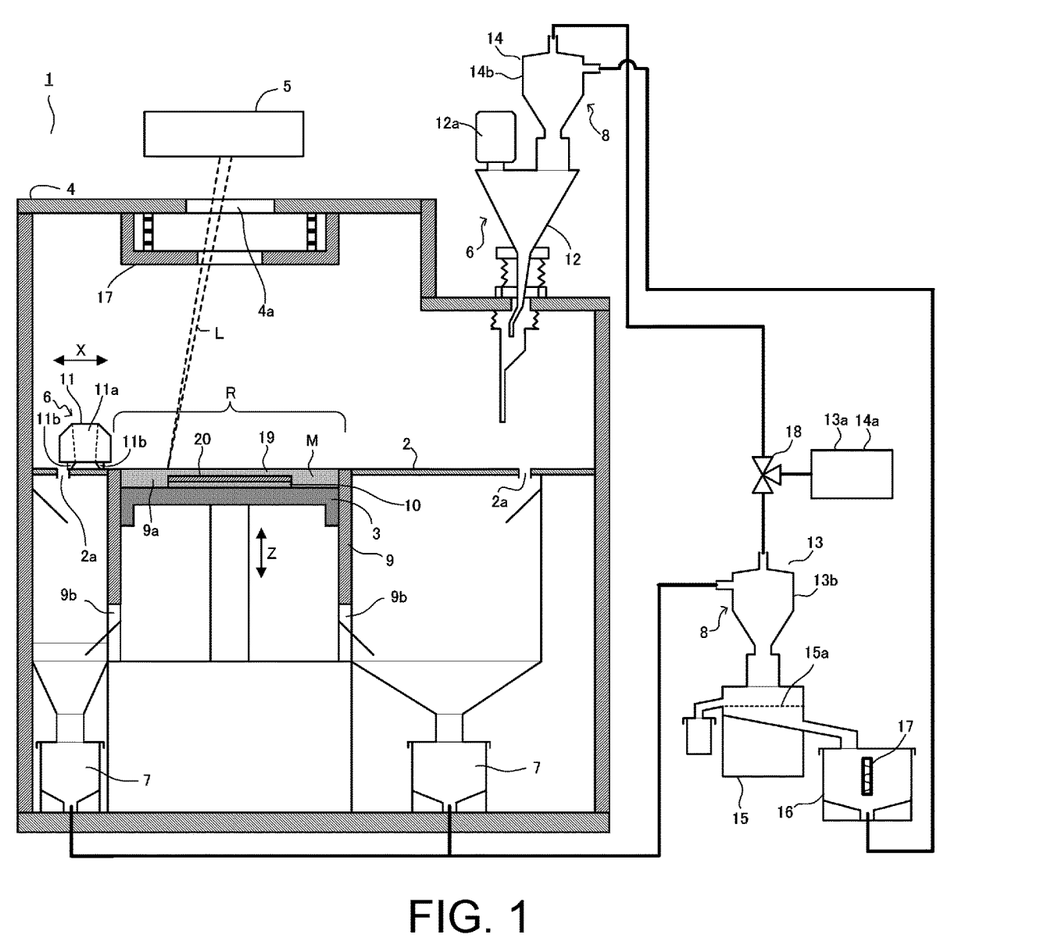
FIG. 1 is a schematic view of a metal laminating modelling device during laminating modelling.
Figure 2:
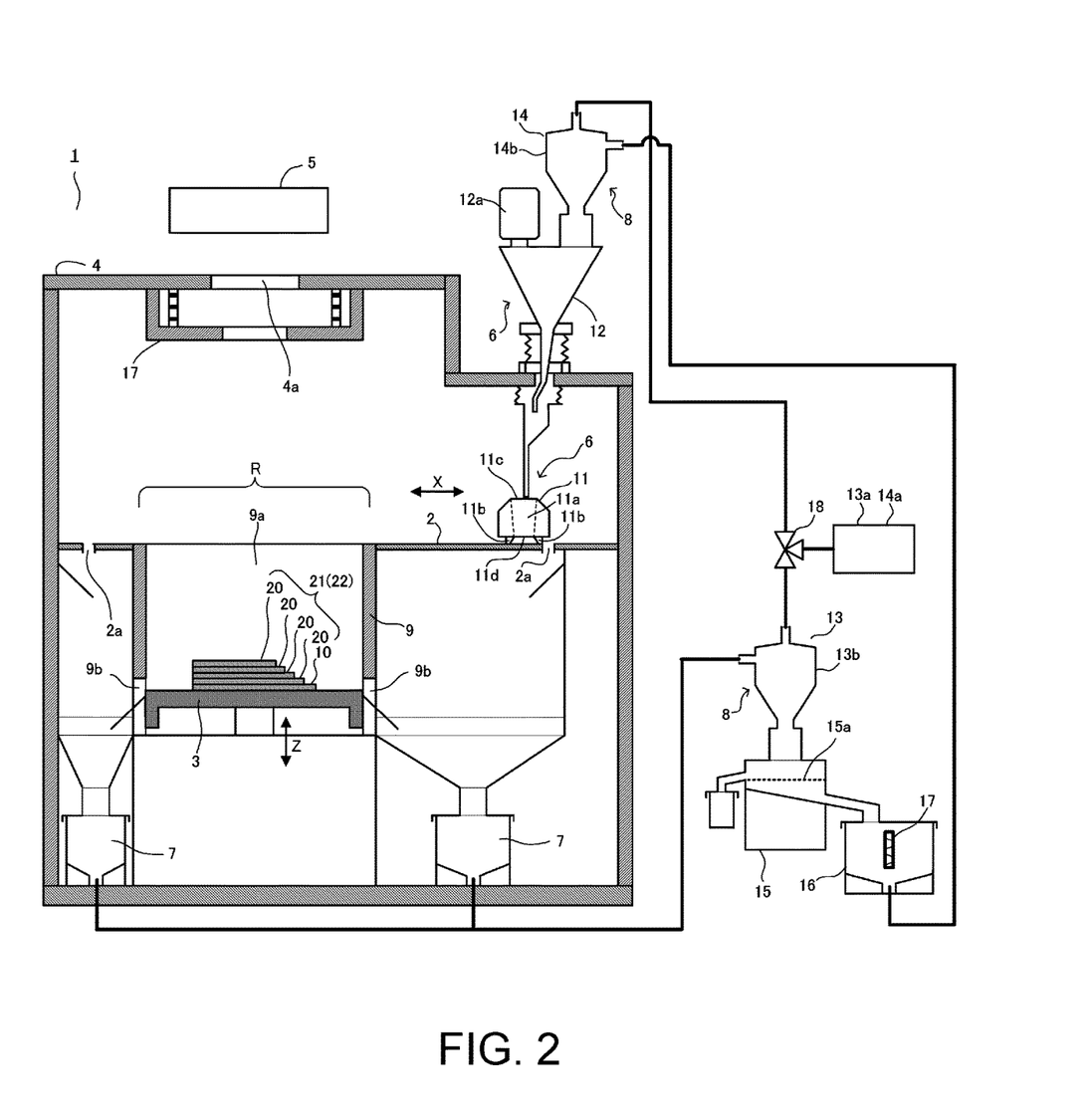
FIG. 2 is a schematic view of a metal laminating modelling device after laminating modelling.
Figure 3:
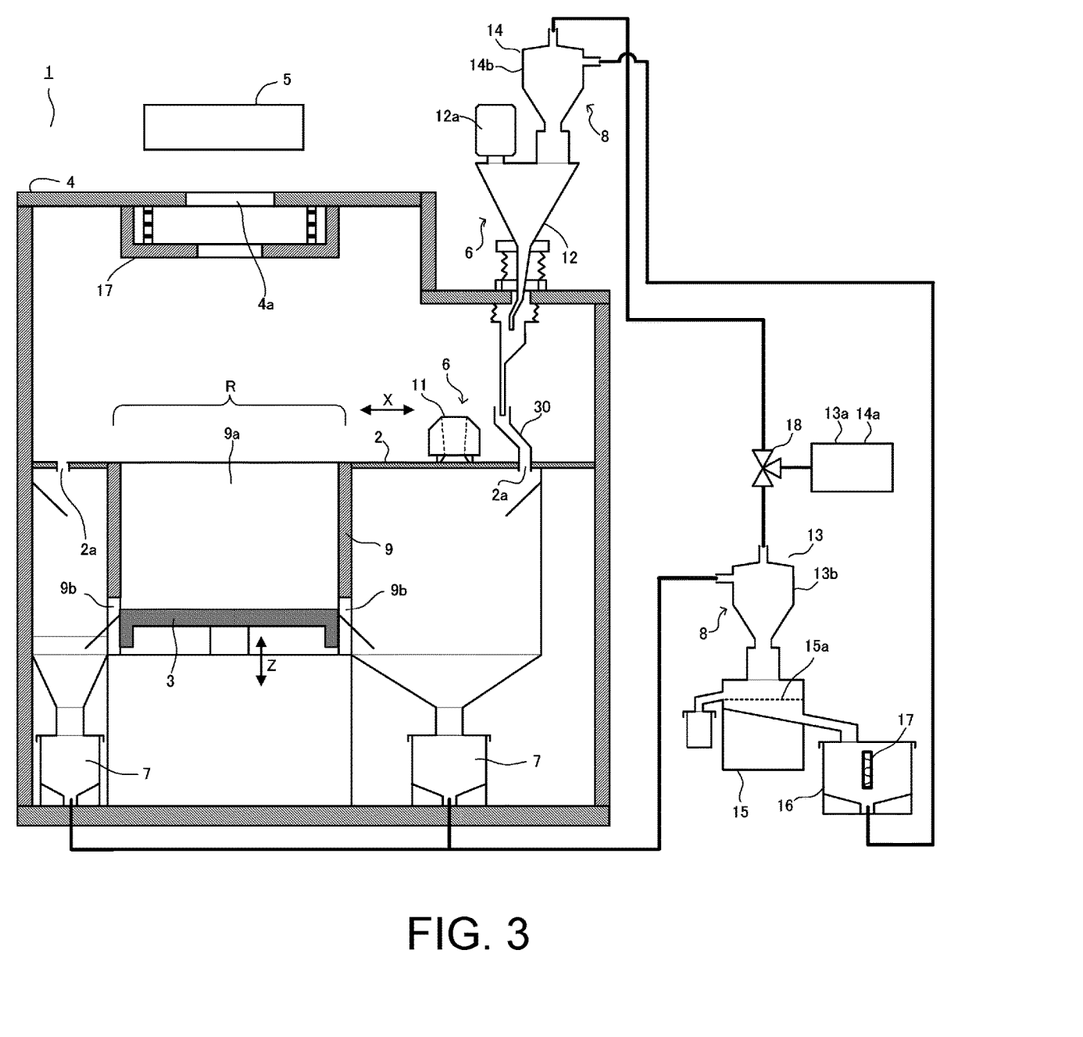
FIG. 3 is a schematic view of a metal laminating modelling device during a durability test.
Figure 4:
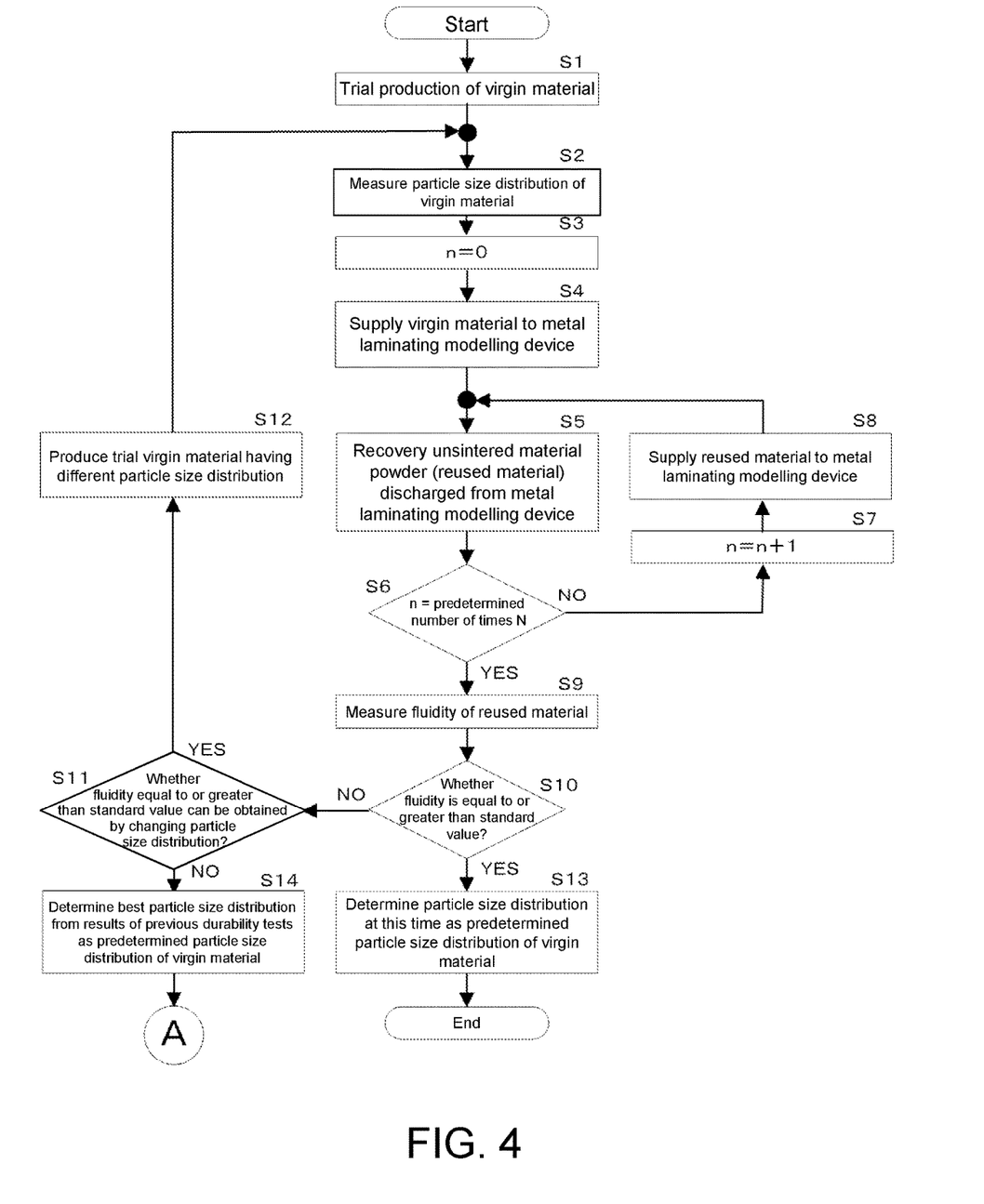
FIG. 4 is a flow chart for determining a predetermined particle size distribution.
Figure 5:
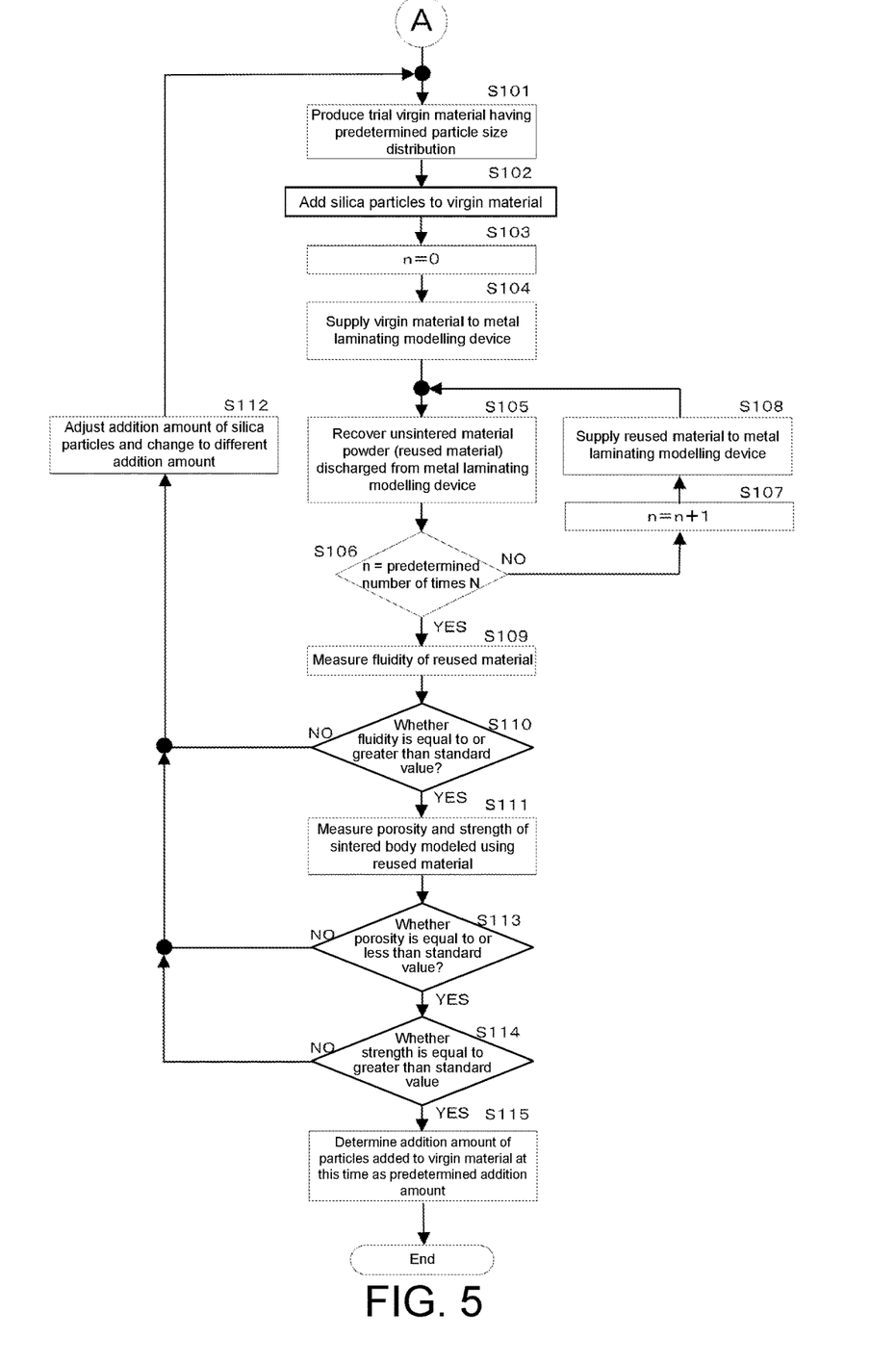
FIG. 5 is a flow chart for determining a predetermined addition amount of silica particles.
Figure 6:
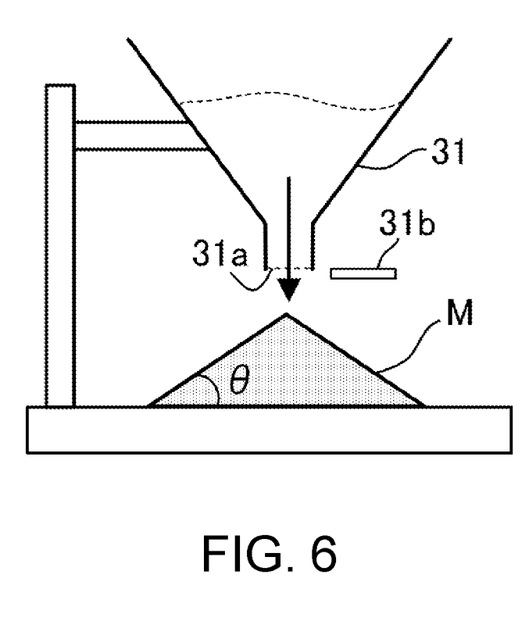
FIG. 6 is a schematic view of a funnel for measuring the fluidity of material powder.

Hereinafter, an embodiment of the disclosure is described in detail with reference to the drawings. FIG. 1 is a schematic view of a metal laminating modelling device during laminating modelling. FIG. 2 is a schematic view of a metal laminating modelling device after laminating modelling. FIG. 3 is a schematic view of a metal laminating modelling device during a durability test. FIG. 4 is a flow chart for determining a predetermined particle size distribution. FIG. 5 is a flow chart for determining a predetermined addition amount of silica particles. FIG. 6 is a schematic view of a funnel for measuring the fluidity of material powder. Here, the X-axis direction in FIG. 1 is a left-right direction. The Y-axis direction (not shown) being a horizontal uniaxial direction orthogonal to the X-axis direction in FIG. 1 is a front-back direction. The Z-axis direction in FIG. 1 is an up-down direction. The thickness dimension of the material powder layer and the thickness dimension of the sintered layer shown in FIG. 1 and FIG. 2 are shown larger than the actual dimensions for the sake of description. The number of layers of the sintered layers shown in FIG. 1 or FIG. 2 is reduced for the sake of description.

As shown in FIG. 1, material powder M for metal laminating modelling (hereinafter, referred to as material powder M) is supplied to a metal laminating modelling device 1. As shown in FIG. 2, in the metal laminating modelling device 1, a part of the supplied material powder M is sintered to form a three-dimensional sintered body, and the unsintered material powder M is discharged.

The metal laminating modelling device 1 includes, for example, a base table 2, a table 3, a chamber 4, a laser light irradiation device 5, a material supply device 6, material recovery buckets 7, and a control device (not shown).

The metal laminating modelling device 1 may include a material transfer device 8 for transferring the unsintered material powder M from the material recovery buckets 7 to the material supply device 6. The metal laminating modelling device 1 may include a cutting device (not shown) in the chamber 4. An electron beam irradiation device (not shown) may be provided instead of the laser light irradiation device 5.

The table 3, a material holding wall 9, and the material recovery buckets 7 are inside the base table 2. The base table 2 has material discharge portions 2a.

The table 3 is moved in the up-down direction (Z-axis direction) in the material holding wall 9 by a driving device (not shown). A modelling area R is formed on the table 3. A base plate 10 is detachably attached to the upper surface of the table 3.

The material holding wall 9 surrounds the table 3. A material holding space 9a is a space surrounded by the material holding wall 9 and the table 3. The material holding wall 9 has material discharge portions 9b.

The material discharge portions 9b of the material holding wall 9 are, for example, openings formed in the lower portion of the material holding wall 9. The material powder M accommodated in the material holding space 9a falls by its own weight into the material recovery buckets 7 from the material discharge portions 9b when the table 3 descends to a position lower than the material discharge portions 9b.

The material discharge portions 2a of the base table 2 are, for example, openings formed around the retraction positions of a recoater head 11 described later. The material powder M overflowing from the material holding space 9a is pushed to the material discharge portions 2a over the material holding wall 9 by blades 11b and 11b of the recoater head 11, and then falls by its own weight into the material recovery buckets 7 from the material discharge portions 2a.

The material powder M discharged through the material discharge portions 9b from the material holding space 9a is accommodated in the material recovery buckets 7. In addition, the material powder M overflowing from the material holding space 9a via the material discharge portions 2a is also accommodated in the material recovery buckets 7.

The chamber 4 covers the modelling area R. The inside of the chamber 4 is filled with an inert gas having a predetermined concentration supplied from an inert gas supply device (not shown). The inert gas is a gas that does not react with the material powder. The inert gas is, for example, nitrogen gas.

The material supply device 6 includes the recoater head 11 and a material replenishing device 12. Here, the unused material powder M is referred to as a virgin material. The unsintered material powder M discharged from the metal laminating modelling device 1 is referred to as a reused material.

The recoater head 11 includes a material accommodating tank 11a and a pair of blades 11b and 11b. The recoater head 11 is moved, by the driving device (not shown), above the table 3 in the left-right direction (X-axis direction) from one retraction position on either the right or the left side of the table 3 to a retraction position on the other side.

The material powder is accommodated in the material accommodating tank 11a. The material accommodating tank 11a is formed inside the recoater head 11. The material accommodating tank 11a communicates with a material supply port 11c formed in the upper portion of the recoater head 11 and a material discharge port 11d formed in the lower portion of the recoater head 11, respectively.

The material supply port 11c is connected to the material replenishing device 12 when, for example, the recoater head 11 is retracted to the retraction position. The material powder M supplied from the material replenishing device 12 is supplied to the material accommodating tank 11a through the material supply port 11c.

The material discharge port 11d is formed into an elongate shape in the front-back direction (Y-axis direction) orthogonal to the moving direction of the recoater head 11. The material powder M is discharged onto the table 3 from the material discharge port 11d. The material powder M is metal powder. The metal powder is, for example, iron powder. The material discharge port 11d is formed to have a short dimension of, for example, 2 mm or more and 3 mm or less in the moving direction (X-axis direction) of the recoater head 11. The lower end of the material discharge port 11d faces the upper surface of the table 3, the upper surface of the base plate 10 attached to the upper surface of the table 3, the upper surface of the previously formed sintered layer 20, or the upper surface of the previously formed material powder layer 19 with a gap of 0.2 mm or more and 0.3 mm or less when the material powder layer 19 is formed. When laminating modelling is performed, the fluidity of the material powder M is an important factor for stably forming a thin material powder layer 19 so as to have a uniform thickness and density.

The pair of blades 11b and 11b protrudes from the lower portion of the recoater head 11 and is arranged on the left and right sides respectively with the material discharge port 11d sandwiched therebetween. The pair of blades 11b and 11b flattens the material powder M which is discharged onto the table 3 from the material discharge port 11d. When laminating modelling is performed, the fluidity of the material powder M is an important factor for stably forming a thin material powder layer 19 so as to have a uniform thickness and density.

The material replenishing device 12 is connected to, for example, a virgin material tank 12a filled with the virgin material being the unused material powder M, and the material transfer device 8 for transferring the reused material being the unsintered material powder M discharged to the material recovery buckets 7.

The material replenishing device 12 can supply the virgin material, the reused material, or the material powder M in which the virgin material and the reused material are mixed to the recoater head 11.

The laser light irradiation device 5 is arranged above the chamber 4. A laser light L output from the laser light irradiation device 5 passes through a protection window 4a provided in the chamber 4 and is irradiated on the modelling area R. The laser light irradiation device 5 includes a laser light source (not shown), a biaxial galvanometer mirror (not shown), and a spot diameter adjusting device (not shown).

The laser light source outputs the laser light L which is capable of heating and melting the material powder M. The laser light L is, for example, a YAG laser, a fiber laser, a carbon dioxide gas laser, and the like.

The spot diameter adjusting device collects the laser light L output from the laser light source and adjusts it to a desired spot diameter.

The biaxial galvanometer mirror two-dimensionally scans, in a controllable manner, the laser light L output from the laser light source and irradiates the laser light L to a desired position within the modelling area R.

The protection window 4a is formed of a material that can transmit the laser light L. If the laser light L is a YAG laser, a fiber laser, or a carbon dioxide gas laser, the protection window 4a can also be made of, for example, quartz glass.

The control device controls various devices provided in the metal laminating modelling device 1. In addition, the control device may also control various peripheral devices connected to the metal laminating modelling device 1.

The material transfer device 8 includes a transfer device for material recovery 13, a transfer device for material supply 14, an impurity removing device 15, and a material supply bucket 16. The material transfer device 8 may also include a material drying device 17. The material drying device 17 dries the material powder M transferred from the material supply bucket 16 to the material replenishing device 12.

The transfer device for material recovery 13 transfers the material powder M in the material recovery buckets 7 to the impurity removing device 15 through a pipe. The transfer device for material recovery 13 includes, for example, a suction device 13a and a filter 13b.

The transfer device for material supply 14 transfers the material powder M in the material supplying bucket 16 to the material replenishing device 12 through a pipe. The transfer device for material supply 14 includes, for example, a suction device 14a and a filter 14b.

Each of the suction devices 13a and 14a has a suction force capable of sucking solid as well as gas. The suction devices 13a and 14a may share one suction device by including a switching valve 18. The suction devices 13a and 14a are, for example, cleaners.

Each of the filters 13b and 14b is, for example, a cyclone type filter. The cyclone type filter separates gas from solid so that the solid is not sucked into the suction devices 13a and 14a.

The impurity removing device 15 removes impurities in the material powder M discharged to the material recovery buckets 7. The impurities are removed by a sieve 15a or the like. The impurities are spatters scattered when the material powder M is sintered by the laser light, or cutting scraps cut out when the surface of the sintered body or unnecessary portions are cut.

The material powder M from which the impurities are removed by the impurity removing device 15 is accommodated in the material supply bucket 16. The reused material may be the unsintered material powder M discharged from the metal laminating modelling device 1 from which the impurities are removed.

The material drying device 17 is, for example, a heater provided in the material supply bucket 16. The reused material may be the unsintered material powder M discharged from the metal laminating modelling device 1 which has been dried.

The basic operation of the metal laminating modelling device 1 described above is as follows.

First, a preparation step is implemented. The base plate 10 is typically mounted on the table 3. The table 3 is moved in such a manner that the height of the upper surface of the base plate 10 is the same as the height of the front ends of the pair of blades 11b and 11b of the recoater head 11.

Subsequently, a recoating step is implemented. The table 3 is lowered by a height corresponding to the thickness of the material powder layer 19. The recoater head 11 is moved above the table 3 from the retraction position to the retraction position on the opposite side. The material powder M is evenly spread on the base plate 10 to a predetermined height. The material powder layer 19 is formed on the base plate 10. The material powder M extruded to the material discharge portions 2a of the base table 2 by the blades 11b and 11b of the recoater head 11 is discharged to the material recovery buckets 7.

Then, a sintering step is implemented. The laser light irradiation device 5 irradiates a predetermined irradiation region of the material powder layer 19 with the laser light L. A sintered layer 20 is formed on the base plate 10. The sintered layer 20 and the base plate 10 are fixed. A sintered body 21 is formed by only the first sintered layer 20.

The recoating step is implemented again. The table 3 is lowered by the height corresponding to the thickness of the material powder layer 19. The recoater head 11 is moved above the table 3 from the retraction position to the retraction position on the opposite side. A new material powder layer 19 is formed on the previously formed sintered layer 20.

The sintering step is implemented again. The laser light irradiation device 5 irradiates a predetermined irradiation region of the material powder layer 19 with the laser light L. A new sintered layer 20 is formed on the previously formed sintered layer 20. The new sintered layer 20 and the previously formed sintered layer 20 are fixed. A sintered body 21 in which the sintered layers 20 are laminated is formed.

The metal laminating modelling device 1 repeats the recoating step and the sintering step to laminate a plurality of sintered layers 20 to form a sintered body 21 having a desired three-dimensional shape and model a modelled object 22 having a desired three-dimensional shape.

Furthermore, the metal laminating modelling device 1 may include a cutting device to implement a cutting step of cutting the sintered body 21 every time a predetermined number of sintered layers 20 are laminated.

When the laminating modelling of the sintered body 21 is ended, the metal laminating modelling device 1 discharges the unsintered material powder M in the material holding space 9a to the material recovery buckets 7. The sintered body 21 fixed to the base plate 10 is removed from the table 3 together with the base plate 10.

The metal laminating modelling device 1 may include the material transfer device 8 to transfer the material powder M in the material recovery buckets 7 to the material supply device 6.

The material powder M in the material recovery buckets 7 is used as the reused material for the subsequent laminating modelling.

Hereinafter, the manufacturing method of the material powder M peculiar to the disclosure is described.

The virgin material of the material powder M is produced so as to have a predetermined particle size distribution. In the particle size distribution, the horizontal axis represents the particle diameter and the vertical axis represents the frequency. For example, the unit of the particle diameter is micrometer. Additionally, for example, the frequency is represented by percentage.

The predetermined particle size distribution is determined based on the fluidity of the reused material after the virgin material has been reused a predetermined number of times N. As shown in FIG. 4, from the results of the durability test of the produced trial virgin material, it is determined that the predetermined particle size distribution is a particle size distribution that corresponds to the fluidity of a value equal to or great than a predetermined standard value. The predetermined standard value of fluidity indicates, for example, the value of fluidity when a material powder layer having a uniform thickness and density can be formed. The predetermined number of times N is a desired number of times of reuse. The predetermined number of times N is, for example, 20 times or more and 40 times or less, preferably 25 times or more and 35 times or less, and further preferably 30 times.

First, a trial virgin material having an optional particle size distribution is produced (S1). The particle size distribution of the virgin material may be measured after the trial production (S2).

Subsequently, a durability test of the produced trial virgin material is implemented. A count n indicating the number of times of reuse is reset to zero (n=0) (S3). The produced trial virgin material is supplied to the metal laminating modelling device 1 (S4). The reused material discharged as the unsintered material powder M is recovered from the metal laminating modelling device 1 (S5). It is determined whether the count n has reached the predetermined number of times N (S6).

If the count n has not reached the predetermined number of times N (n<N), the count n is increased by one (n=n+1=1) (S7). The recovered reused material is supplied again to the metal laminating modelling device 1 (S8). The reused material discharged as the unsintered material powder M is recovered again from the metal laminating modelling device 1 (S5). It is again determined whether the count n has reached the predetermined number of times N (S6). If the count n has not reached the predetermined number of times N (n<N), the count n is increased by one again (n=n+1=2) (S7). As described above, the produced trial virgin material is repeatedly reused until the count n reaches the predetermined number of times N (n=N).

Finally, the fluidity of the reused material after being reused for the predetermined number of times N is measured (S9). It is determined whether the fluidity of the reused material is equal to or greater than the predetermined standard value (S10).

If the fluidity of the reused material is equal to or greater than the predetermined standard value, the particle size distribution of the produced trial virgin material is set to the predetermined particle size distribution (S13).

If the fluidity of the reused material is below the predetermined standard value, a trial virgin material having a different optional particle size distribution is produced again (S12), and the durability test is performed again. Alternatively, if the fluidity of the reused material is lower than the predetermined standard value, it may be determined whether there is a possibility to obtain a fluidity of the reused material equal to or greater than the predetermined standard value simply by changing the particle size distribution of the virgin material (S11).

If there is a possibility to obtain a fluidity of the reused material equal to or greater than the predetermined standard value simply by changing the particle size distribution of the virgin material, a trial virgin material having a different optional particle size distribution may be produced again (S12), and the durability test may be performed again.

If there is no possibility to obtain a fluidity of the reused material equal to or greater than the predetermined standard value simply by changing the particle size distribution of the virgin material, the best particle size distribution from the results of the previous durability test may be determined as the predetermined particle size distribution of the virgin material (S14), and as shown in FIG. 5, a trial virgin material having the determined predetermined particle size distribution may be produced (S101), and the silica particles mentioned later may be added to the produced trial virgin material (S102). The best particle size distribution indicates, for example, the particle size distribution of the virgin material being the source of the reused material which has the highest fluidity after being reused for a predetermined number of times out of the results of the durability tests performed on plural types of virgin materials having the same material but different particle size distributions.

The durability test may be implemented while performing laminating modelling. The durability test may be implemented while repeating only the recoating step. The durability test may be implemented without performing laminating modelling. The durability test may be implemented with, for example, the recoating step and the sintering step omitted. For example, as shown in FIG. 3, the durability test may be implemented in such a manner that the material replenishing device 12 is connected in advance to the material discharge portion 2a of the base table 2 by a connecting member 30, and the virgin material or the reused material is directly discharged from the material replenishing device 12 to the material recovery buckets 7. In particular, by implementing the durability test without performing laminating modelling, the durability test can be implemented easily and quickly.

In the durability test, the process from the supply of the virgin material by the material transfer device 8 provided in the metal laminating modelling device 1 to the completion of the reuse for the predetermined number of times N may be automatically controlled by the control device of the metal laminating modelling device 1.

In the durability test, the virgin material may be supplied into, for example, the virgin material tank 12a of the material replenishing device 12. In addition, in the durability test, the virgin material may also be supplied into the material supply bucket 16 of the material transfer device 8.

As for the count n indicating the number of times of reuse, for example, the operation from the supply of the material powder M from the material supply bucket 16 to the material replenishing device 12 to the recovery of the material powder M from the material recovery buckets 7 to the material supply bucket 16 via the impurity removing device 15 may be counted as one time.

As shown in FIG. 6, the fluidity of the reused material is determined by adding a predetermined amount of the reused material being the material powder M to the funnel 31 and measuring a discharge time and an angle of repose θ, respectively. The funnel 31 temporarily stores the reused material by an opening/closing mechanism 31b closing a discharge port 31a, and discharges the reused material from the discharge port 31a by the opening/closing mechanism 31b opening the discharge port 31a.

The discharge time indicating the fluidity is the time from the start of the falling of the reused material from the discharge port 31a of the funnel 31 by its own weight to the completion of the falling. The shorter the discharge time is, the higher the fluidity will be.

The angle of repose θ indicating the fluidity is an angle formed by the slope and the horizontal surface of the pile of the reused material when the reused material is made to fall from a predetermined height using the funnel 31 and is stable without spontaneously collapsing. The smaller the angle of repose θ is, the higher the fluidity will be.

Here, the standard values of the discharge time and the angle of repose θ indicating the fluidity of the reused material reused the predetermined number of times N is a threshold value when it is confirmed in advance that a uniform material powder layer 19 can be formed. Being equal to or greater than the predetermined standard value of fluidity means that the discharge time of the reused material is the same as or shorter than the above standard value of the discharge time, and that the angle of repose θ of the reused material is the same as or smaller than the above standard value of the angle of repose θ.

For example, in the particle size distribution of the virgin material, the frequency of the particles having a particle diameter of 17 μm or less may be 4% or less. In addition, for example, in the particle size distribution of the virgin material, the frequency of the particles having a particle diameter of 17 μm or less may be 4% or less, and the frequency of the particles having a particle diameter of 53 μm or more may be 8% or less. At this time, the value of the fluidity is equal to or greater than the standard value even if reuse is performed 25 to 35 times. The predetermined number of times N of reuse may be 25 to 35 times.

In one embodiment, in the particle size distribution of the virgin material, a median diameter indicating the particle diameter that accounts for 50% in the cumulative distribution is within the range of 17 μm or more and 53 μm or less, a mode diameter indicating the particle diameter that has a maximum frequency in the frequency distribution is within the range of 17 μm or more and 53 μm or less, and the frequency of the particles having a particle diameter of 17 μm or less is 3% or less. In another embodiment, in the particle size distribution of the virgin material, the median diameter indicating the particle diameter that accounts for 50% in the cumulative distribution is within the range of 17 μm or more and 53 μm or less, the mode diameter indicating the particle diameter that has a maximum frequency in the frequency distribution is within the range of 17 μm or more and 53 μm or less, the frequency of the particles having a particle diameter of 17 μm or less is 3% or less, and the frequency of the particles having a particle diameter of 53 μm or more is 7% or less. At this time, the value of the fluidity is equal to or greater than the standard value even if reuse is performed 28 to 32 times. The predetermined number of times N of reuse may be 28 to 32 times.

Silica particles may be added to the virgin material of the material powder M. The particle diameter of the silica particles may be 5 nm or more and 15 nm or less, and preferably 10 nm.

The silica particles may be added to a virgin material capable of maintaining the fluidity equal to or greater than the standard value of fluidity in the durability test. The silica particles may also be added to a virgin material that has failed to maintain the fluidity equal to or greater than the standard value of fluidity in the durability test. The durability test may be performed on the virgin material to which silica particles are added.

The silica particles have the effect of adhering to the surface of the material powder M and enhancing the fluidity of the material powder M. The silica particles are added to the virgin material of the material powder M by being put into a stirrer together with the virgin material of the material powder M and stirred.

When the addition amount of the silica particles is, for example, 0.01% or more and 0.09% or less of the total amount of the virgin material of the material powder M, and preferably 0.05% of the total amount of the virgin material of the material powder M, the fluidity of the material powder M can be sufficiently enhanced.

The addition amount of the silica particles may be determined by comparing the porosity and the strength of the sintered body 21 before and after the addition. The silica particles can further maintain the quality of the sintered body 21 by, for example, being added to the virgin material of the material powder M containing silicon (Si) as a composition element.

For example, as shown in FIGS. 4 and 5, the silica particles may be added to a virgin material in which the fluidity of the reused material is below the standard value in the durability test. As shown in FIG. 5, the addition amount of the silica particles added to the virgin material may be determined based on the fluidity of the reused material after the durability test and the porosity and the strength of the sintered body 21 actually modelled by the reused material. Besides, the addition amount of the silica particles added to the virgin material may be determined based on the fluidity of the reused material after the durability test and the porosity of the sintered body 21 actually modelled by the reused material. Furthermore, the addition amount of the silica particles added to the virgin material may be determined based on the fluidity of the reused material after the durability test and the strength of the sintered body 21 actually modelled by the reused material.

The predetermined standard value of fluidity indicates, for example, the value of fluidity when a material powder layer having a uniform thickness and density can be formed. The predetermined standard value of the porosity and the predetermined standard value of the strength of the sintered body 21 may be determined based on the porosity and the strength of the sintered body 21 modelled by the virgin material or the reused material of the material powder M to which silica particles are not added, and based on the quality of the sintered body 21.

First, as shown in FIG. 4, if there is no possibility to obtain a fluidity of the reused material equal to or greater than the predetermined standard value simply by changing the particle size distribution of the virgin material (S11), the best particle size distribution from the results of the previous durability tests is determined as the predetermined particle size distribution of the virgin material (S14). Then, a trial virgin material having the predetermined particle size distribution is produced (S101). An optional amount of silica particles is added to the produced trial virgin material (S102).

Subsequently, the durability test of the produced trial virgin material is implemented. The count n indicating the number of times of reuse is reset to zero (n=0) (S103). The produced trial virgin material is supplied to the metal laminating modelling device 1 (S104). The reused material discharged as the unsintered material powder M is recovered from the metal laminating modelling device 1 (S105). It is determined whether the count n has reached a predetermined number of times N (S106).

If the count n has not reached the predetermined number of times N (n<N), the count n is increased by one (n=n+1=1) (S107). The recovered reused material is supplied again to the metal laminating modelling device 1 (S108). The reused material discharged as the unsintered material powder M is recovered again from the metal laminating modelling device 1 (S105). It is again determined whether the count n has reached the predetermined number of times N (S106). If the count n has not reached the predetermined number of times N (n<N), the count n is increased by one again (n=n+1=2) (S107). As described above, the produced trial virgin material is repeatedly reused until the count n reaches the predetermined number of times N (n=N).

Finally, the fluidity of the reused material after being reused the predetermined number of times N is measured (S109). It is determined whether the fluidity of the reused material is equal to or greater than the predetermined standard value (S110).

When the fluidity of the reused material is below the predetermined standard value, the addition amount of the silica particles is adjusted and changed to an optional different addition amount (S112). A trial virgin material having the predetermined particle size distribution is produced again (S101), the silica particles having the changed addition amount are added to the trial virgin material newly produced and having the predetermined particle size distribution (S102), and the durability test is performed again.

If the fluidity of the reused material is equal to or greater than the predetermined standard value, the reused material is supplied to the metal laminating modelling device 1, and laminating modelling of the sintered body 21 is performed using the reused material by the metal laminating modelling device 1. Then, the porosity and the strength of the modelled sintered body 21 are measured (S111). It is determined whether the porosity of the sintered body 21 is equal to or greater than the predetermined standard value (S113).

If the porosity of the sintered body 21 is below the predetermined standard value, the addition amount of the silica particles is adjusted and changed to an optional different addition amount (S112). A trial virgin material having the predetermined particle size distribution is produced again (S101), the silica particles having the changed addition amount are added to the trial virgin material newly produced and having the predetermined particle size distribution (S102), and the durability test is performed again.

If the porosity of the sintered body 21 is equal to or greater than the predetermined standard value, it is determined whether the strength of the sintered body 21 is equal to or greater than the predetermined standard value (S114).

If the strength of the sintered body 21 is below the predetermined standard value, the addition amount of the silica particles is adjusted and changed to an optional different addition amount (S112). A trial virgin material having the predetermined particle size distribution is produced again (S101), the silica particles having the changed addition amount are added to the trial virgin material newly produced and having the predetermined particle size distribution (S102), and the durability test is performed again.

If the strength of the sintered body 21 is equal to or greater than the predetermined standard value, the addition amount of the silica particles added to the virgin material which is the source of the reused material at this time is determined as the predetermined addition amount (S115). Moreover, if the fluidity of the reused material is equal to or greater than the predetermined standard value, the virgin material which is the source of the reused material is supplied to the metal laminating modelling device 1, laminating modelling of the sintered body 21 is performed using the virgin material by the metal laminating modelling device 1, and it may be determined whether the porosity and the strength of the sintered body 21 are equal to or greater than the predetermined standard values.

The embodiment was chosen in order to explain the principles of the invention and its practical application. Many modifications and variations are possible in light of the above teachings. It is intended that the scope of the invention be defined by the claims.

What is claimed is:

1. A method for metal laminating modelling, comprising:
   measuring a particle size distribution of a trial virgin material being a material powder that is unused;
   performing a durability test comprising:
   (a) supplying the trial virgin material to a metal laminating modelling device;
   (b) recovering an unsintered material being at least a portion of the trial virgin material that is unsintered and discharge from the metal laminating modelling device after the step (a);
   (c) re-supplying the unsintered material to the metal laminating modelling device;
   (d) recovering the unsintered material discharged from the metal laminating modelling device after the step (c);
   (e) repeating the (c) and (d) steps for n times, where n is more than 19 times;
   (f) measuring a fluidity of the unsintered material after the step (e) by measuring a discharge time and an angle of repose of the unsintered material, wherein the discharge time of the unsintered material is a time from the start of the falling of the unsintered material from a discharge port of a funnel by its own weight to the completion of the falling, and the angle of repose of the unsintered material is an angle formed by a slope and a horizontal surface of a pile of the unsintered material when the unsintered material is made to fall from the funnel and the pile of the unsintered material does not collapse spontaneously;

obtaining a predetermined standard value of the fluidity by measuring a standard discharge time and a standard angle of repose of a standard material, being a material that forms a material powder layer having a uniform thickness and density, wherein the standard discharge time of the standard material is a time from the start of the falling of the standard material from the discharge port of the funnel by its own weight to the completion of the falling, and the angle of repose of the standard material is an angle formed by a slope and a horizontal surface of a pile of the standard material when the standard material is made to fall from the funnel and the pile of the standard material does not collapse spontaneously;

wherein, if the fluidity of the unsintered material obtained in the step (f) is equal to or greater than the predetermined standard value, setting the particle size distribution of the trial virgin material as a predetermined particle size distribution, and producing a virgin material being the material powder having the predetermined particle size distribution for metal laminating modelling, and performing the metal laminating modelling after the durability test by:

repeating a recoating step of forming a material powder layer by the material powder obtained, and a sintering step of irradiating the material powder layer with a laser light in the metal laminating modelling device; and collecting an unsintered material from the metal laminating modelling device for reuse, and reusing the unsintered material collected for x times in the recoating step and the sintering step such that the fluidity of the unsintered material will not reduce below the predetermined standard value of the fluidity, wherein the x times is determined by a measurement result from the durability test, wherein if the fluidity of the unsintered material is determined by the measurement result to be equal to or greater than the predetermined standard value, then then times performed in step (e) of the durability test is set as the x times performed in the recoating and sintering step; and if the fluidity of the unsintered material obtained in the step (f) is lower than the predetermined standard value, producing a second trial virgin material, being the material powder that is unused and having another particle size distribution different from the particle size distribution of the trial virgin material, and performing the durability test again using the second trial virgin material, and confirming the fluidity of an unsintered material of the second trial virgin material measured from the durability test, or adding silica particles to a new unused batch of the trial virgin material having the particle size distribution until the predetermined standard value of the fluidity is reached, and determining an addition amount of the silica particles as a predetermined addition amount, and producing a virgin material being the material powder having the predetermined addition amount of silica particles added thereto for metal laminating modelling, and performing the metal laminating modelling after the durability test by:

repeating a recoating step of forming the material powder layer by the material powder obtained, and a sintering step of irradiating the material powder layer with a laser light in the metal laminating modelling device; and collecting an unsintered material from the metal laminating modelling device for reuse, and reusing the unsintered material collected for y times in the recoating step and the sintering step such that the fluidity of the unsintered material will not reduce below the predetermined standard value of the fluidity, wherein the y times is determined by a measurement result from the durability test, wherein if the fluidity of the unsintered material is determined by the measurement result to be equal to or greater than the predetermined standard value, then the n times performed in step (e) of the durability test is set as the y times performed in the recoating and sintering step.

2. The method for metal laminating modelling according to claim 1, wherein
the durability test is implemented without performing the metal laminating modelling.

3. The method for metal laminating modelling according to claim 1, wherein
in the particle size distribution, a frequency of the particles having a particle diameter of 17 μm or less is 4% or less.

4. The method for metal laminating modelling according to claim 3, wherein
in the particle size distribution,
a median diameter indicating the particle diameter that accounts for 50% in a cumulative distribution is within a range of 17 μm or more and 53 μm or less,
a mode diameter indicating the particle diameter that has a maximum frequency in the frequency distribution is within a range of 17 μm or more and 53 μm or less, and
the frequency of the particles having a particle diameter of 17 μm or less is 3% or less.

5. The method for metal laminating modelling according to claim 1, wherein
the silica particles have a particle diameter of 5 nm or more and 15 nm or less.

6. The method for metal laminating modelling according to claim 1, wherein the method further comprises:
performing a second durability test, comprising:
(a') supplying the virgin material being the material powder having the predetermined addition amount of silica particles to the metal laminating modelling device;
(b') recovering a second unsintered material being at least a portion of the virgin material having the predetermined addition amount of silica particles that is unsintered and discharged from the metal laminating modelling device after the step (a');
(c') re-supplying the second unsintered material to the metal laminating modelling device;
(d') recovering the second unsintered material discharged from the metal laminating modelling device after the step (c');
(e') repeating the (c') and (d') steps more than 19 times;
(f') measuring a fluidity of the second unsintered material after the step (e') by measuring a discharge time and an angle of repose of the second unsintered material, wherein the discharge time of the second unsintered material is a time from the start of the falling of the second unsintered material from the discharge port of the funnel by its own weight to the completion of the falling, and the angle of repose of the second unsintered material is an angle formed by a slope and a horizontal surface of a pile of the second unsintered material when the second unsintered material is made to fall from the funnel and the pile of the second unsintered material does not collapse spontaneously;

performing laminating modelling for forming a sintered body, which comprises:

a recoating step of forming the material powder layer made of the second unsintered material after the step (e');

a sintering step of irradiating the material powder layer with a laser light; and repeating the recoating step and sintering step to form the sintered body;

measuring a porosity of the sintered body and a strength of the sintered body;

determine whether the porosity of the sintered body is equal to or greater than a predetermined standard value of the porosity, and/or determine whether the strength of the sintered body is equal to or greater than a predetermined standard value of the strength;

if the porosity of the sintered body is less than the predetermined standard value of the porosity and/or the strength of the sintered body is less than the predetermined standard value of the strength, adjusting the predetermined addition amount of the silica particles until the predetermined standard value of the porosity and/or the predetermined standard value of the strength is reached, as long as the fluidity measured in the step (f') is equal to or greater than the predetermined standard value of the fluidity.

7. The method for metal laminating modelling according to claim 1, wherein silicon is contained in composition elements of the virgin material.

* * * * *